M. MUELLER.
Assignor, by mesne assignments, of part interest to L. A. BRIGEL and L. BURGER.
BREWING.
No. 10,447. Reissued Feb. 5, 1884.
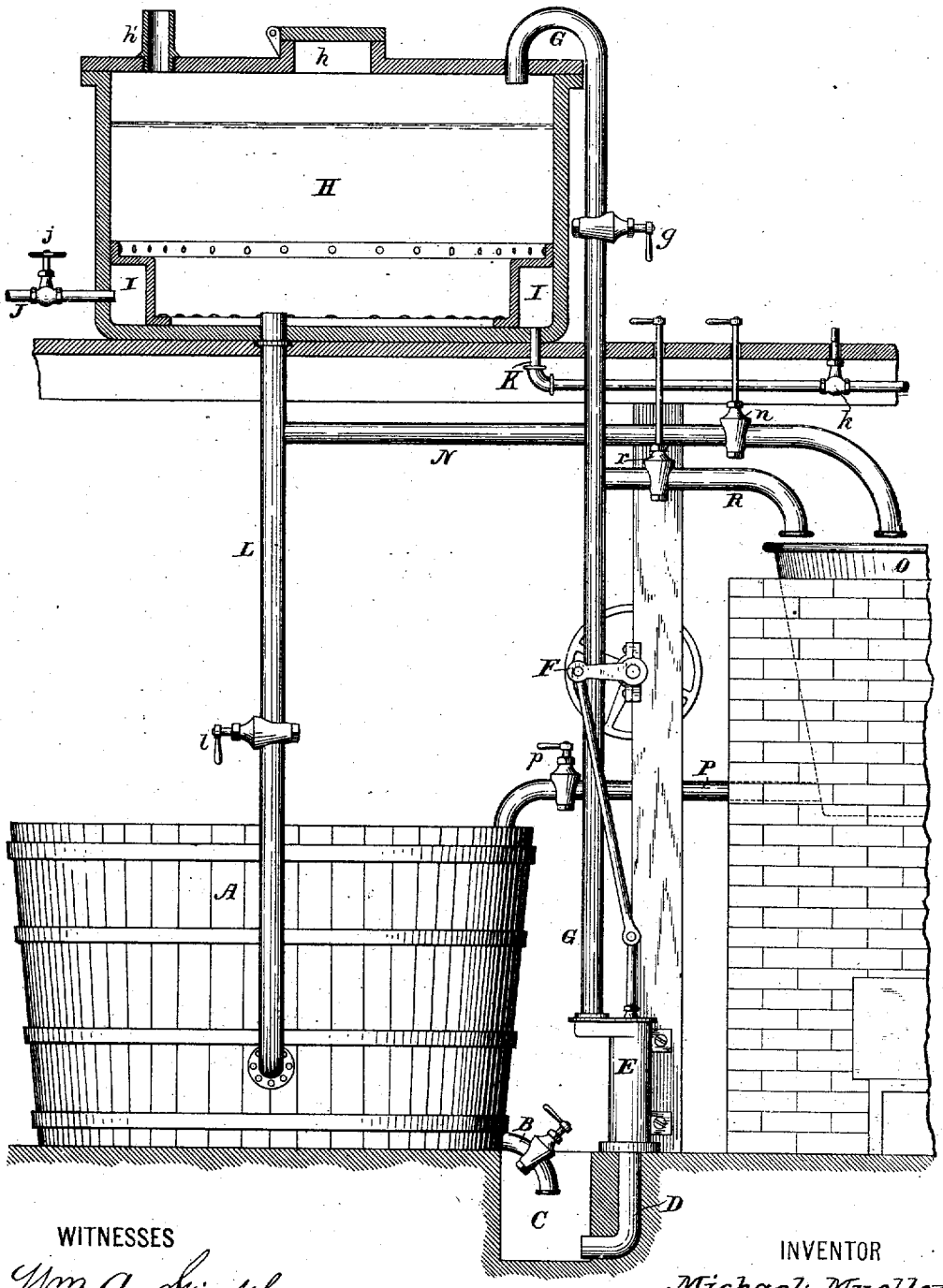
WITNESSES
Wm A. Skinkle
H. W. Elmore.
INVENTOR
Michael Mueller
By his Attorneys.
Pancoast & Pancoast
N. PETERS. Photo-Lithographer, Washington, D. C.

UNITED STATES PATENT OFFICE.

MICHAEL MUELLER, OF CINCINNATI, OHIO, ASSIGNOR, BY MESNE ASSIGNMENTS, OF PART INTEREST TO LEO A. BRIGEL AND LOUIS BURGER, OF SAME PLACE.

BREWING.

SPECIFICATION forming part of Reissued Letters Patent No. 10,447, dated February 5, 1884.

Original No. 247,200, dated September 20, 1881. Application for reissue filed September 17, 1883.

*To all whom it may concern:*

Be it known that I, MICHAEL MUELLER, of Cincinnati, in the county of Hamilton and State of Ohio, have invented certain new and useful Improvements in Brewing, of which the following is a specification.

After the wort has been drawn from the mash-tub, until the mash is no longer capable of furnishing further wort of sufficient strength to be used directly for the manufacture of beer, there is still an appreciable percentage of sugar and other valuable ingredients of the mash capable of being extracted by further steeping it in heated water. By applying another charge of heated water in the mash-tub, and allowing the mash to steep in it in the same way that it has before been steeped to obtain the wort, and then drawing off the resultant liquor, a thin wort is obtained, commonly known as "glattwasser" or "sugar-water." The saccharine and other soluble ingredients of this extract are valuable for beer-making purposes, if they can be economically preserved and utilized; but this glattwasser not being of sufficient strength to go directly into beer, and being soured by the fermentation which results immediately upon its exposure to air at ordinary temperature, its constituents have usually been, so far as brewing is concerned, a waste, though it has sometimes been obtained for the manufacture of vinegar or other foreign uses.

The object of my invention is to utilize the constituents of this glattwasser for beer-making purposes, while at the same time utilizing for dissolving subsequent charges of malt certain qualities of the glattwasser especially adapted thereto. I avoid the souring of the glattwasser by keeping it at a sufficient temperature to prevent fermentation until it can be used to dissolve a fresh charge of mash. This I do by conveying it directly from the mash-tub to a suitable tank or other receptacle adapted to apply and maintain a sufficient degree of heat for this purpose. I here heat the glattwasser, being careful not to allow it to fall substantially below the temperature at which it comes from the mash-tub, and to keep it at a temperature between that and about 212° Fahrenheit, until its application to a new charge of mash. It is in this heated condition conducted to the mash-tub, which has meanwhile been charged with fresh malt, contributing its own constituents to the wort obtained from this charge, while its softness renders it especially efficacious in dissolving the mash. The heat which this glattwasser contains when first drawn from the mash-tub is also saved. As this glattwasser should be kept at a temperature above that desired for the first charge of the mash-tub, I have commonly used it for the second charge.

The preferred arrangement of apparatus for carrying my process into operation is seen in the annexed drawing, in which the tank for heating the glattwasser is sectioned, while the other appliances are shown in elevation.

The mash-tub or tun A, which may be of any desired shape and capacity, has at bottom one or more cocks or valves, B, capable of drawing off the glattwasser or sugar-water from said tub and discharging it into a trough or other receptacle, C. Communicating with this trough is a suction-pipe, D, of a suitable pump, E, which latter may be operated by hand or by a crank-connection, as shown at F. The discharge-pipe G of this pump is carried up as high as may be convenient, and enters an elevated tank or cistern or other appropriate receptacle, H, having at top a door or man-hole, *h*, and a vent-pipe, *h'*.

At *g* is represented the cock or valve of the discharge-pipe. The bottom of tank H is provided with a steam-chamber, I, that is preferably annular, and has an inlet-pipe, J, controlled by a throttle-valve, *j*. A drain-pipe, K, having a valve, *k*, serves to relieve the steam-chamber I of its water of condensation. Proceeding from the bottom of this tank H is a discharge-pipe, L, that communicates with the mash-tub A, a cock, *l*, controlling the flow of the glattwasser through said pipe, and, if preferred, this pipe may have a valved branch, N *n*, for allowing the glattwasser to run from said tank into the kettle O.

P *p* is a valved pipe leading from the kettle O to the mash-tub A.

R *r* is a valved branch leading from the discharge-pipe G into the kettle O.

The operation of this apparatus is as follows: The grain is mashed and the wort drawn off in the usual manner. After the wort has been drawn off as many times as it can be obtained of sufficient strength to pass directly into the manufacture of beer, the mash-tub is again charged with warm water, in which the partially-exhausted mash is steeped as before. The cock B is opened, and the waste fluid contained in the tun—the glattwasser or sugar-water—is discharged directly into the trough C, and the pump E is at once set in motion, so as to remove this glattwasser from said receptacle C before the atmosphere has had time to cause fermentation to take place. The valve *r* being closed and the cock *g* opened, the glattwasser is accordingly pumped up into the tank or cistern H, and is there heated by steam admitted through pipe J into the annular chamber I.

It is not designed to heat the glattwasser under pressure, and accordingly the vent *h'* is provided to allow a free escape of vapor as soon as the temperature of the water reaches about 212° Fahrenheit. Any excessive heating would caramelize the saccharine and starch contained in the glattwasser, and render it unfit for further use, while a reduction of the temperature below 160° Fahrenheit would render it liable to sour. After the glattwasser has been heated to the proper temperature and the next charge of grain is ready, the cock *n* is closed, the cock *l* opened, and the liquor descends directly into the tub A, and is used for mashing the said charge. By thus using the glattwasser a saving of from six to twenty per cent. is realized.

If it should be desired to run the glattwasser from the tank H into the kettle O, it can be done simply by opening the cock *n* and closing the cock *l*, and the contents of said kettle can at any time be discharged into the mash-tub A by opening the valve *p*. Furthermore, the glattwasser can be pumped directly into the kettle O after the valve *g* has been closed and the valve *r* opened.

The apparatus is especially valuable where water is hard, owing to the presence of lime, saltpeter, &c., as the above-described process renders such water soft and capable of being used for all kinds of brewing purposes.

I do not propose to limit my invention to the special construction of apparatus herein illustrated, but reserve the right of modifying or entirely reorganizing the same, as circumstances may suggest.

I claim as my invention—

1. The within-described process of brewing, which process consists in steeping the grain in warm water after the wort has been drawn off, then discharging the resultant glattwasser into a suitable receptacle, where it is properly heated, and finally returning this glattwasser or sugar-water to the mash-tub, substantially as herein described, and for the purpose set forth.

2. The improvement in the art of brewing, consisting in applying heat to the glattwasser, and then applying said glattwasser, before it has become cool, to the steeping of subsequent charges of malt.

MICHAEL MUELLER.

Witnesses:
GEO. B. PARKINSON,
FRANK W. BURNHAM.